United States Patent Office 2,835,659
Patented May 20, 1958

2,835,659

POLYPROPYLENE WAXES AND METHOD OF MAKING

James E. Guillet, Kingsport, Tenn., assignor to Eastman Kodak Company, Rochester, N. Y., a corporation of New Jersey No Drawing. Application February 11, 1957
Serial No. 639,189

5 Claims. (Cl. 260—93.7)

This invention relates to synthetic hydrocarbon waxes which are characterized by being extremely hard and high melting but which have low melt viscosity characteristics so that the waxes can be readily employed for coatings and the like. More particularly the invention is concerned with certain synthetic waxes and their preparation from highly crystalline polypropylene.

Of the naturally occurring waxes, carnauba wax has been widely used in various coating formulations because it combines the characteristics of low melt viscosity with high hardness characteristics. A disadvantage of the carnauba wax, however, is its relatively low softening point as well as its expensive character. Synthetic hydrocarbon waxes have been prepared in the past, but such synthetic waxes ordinarily have a high melt viscosity which makes it difficult to use the waxes for coating applications where it is desired to have a readily flowable material.

Recently, synthetic waxes composed of low molecular weight polyethylene have come into increasing use as substitutes for carnauba wax since they have a softening point which is greater than that of carnauba wax and have hardness characteristics which are generally comparable to carnauba wax. Generally, however, these polyethylene waxes have a relatively high melt viscosity, and it is also desirable to obtain materials of even higher hardness and higher softening point. The polyethylene waxes can be produced by merely polymerizing ethylene to a relatively low molecular weight polymer which is waxy in character or by polymerizing ethylene to a higher molecular weight, i. e. to a plastic state, and then thermally treating the resulting high molecular weight polymer to reduce its molecular weight into the desired range.

For many years, propylene could not be polymerized to anything but oils and rubberlike semisolids which had no value as waxes. More recently, methods have been devised whereby solid polymers of propylene can be prepared, usually of relatively high crystalline character. Such methods are typified by Belgian Patent 538,782 and by Belgian Patent 530,617, among others. Unlike ethylene, it was not possible to polymerize propylene to form waxy polymers directly since the major part of the low molecular weight polypropylene having a molecular weight in the range of 1000 to 8000 was an oily or a rubbery semisolid similar to the polymers prepared using either Friedel-Crafts or free radical catalysts. Thus it was necessary to polymerize propylene into the plastic range before a usable polymer could be obtained. The highly crystalline solid polypropylene which has been prepared by catalysis with a metal-containing catalyst has a density of the order of 0.90 or more and a molecular weight of above 10,000 and usually above 20,000. These highly crystalline polypropylenes, when heated at temperatures of about 150–170° C., converted into very viscous transparent masses as described in Australian patent application 9651/55.

It thus appeared that polypropylene, which differs markedly from polyethylene in many of its characteristics, could not be formed into relatively low molecular weight waxy solids either directly or by heating of a higher molecular weight polymer. In both cases, the art indicated that the products obtained would be viscous liquids rather than waxy solids.

Thus, prior to this invention, the polyethylene waxes provided the best substitute for carnauba wax since they generally match the charcateristics of carnauba wax except for having a higher melt viscosity. It was therefore desirable to be able to produce a synthetic wax having the low melt viscosity which is characteristic of carnauba wax but having greatly improved hardness and softening point characteristics.

It is therefore an object of this invention to provide new and improved synthetic waxes which have hardness characteristics in excess of the hardness of carnauba wax and which combine this high hardness value with the low melt viscosity which is a primary virtue of carnauba wax.

It is another object of the invention to provide new and improved synthetic waxes which have much higher softening points than carnauba wax without sacrificing the low melt viscosity characteristics which are desirable in many coating applications.

Another object of the invention is to provide a method whereby synthetic waxes can be prepared which compete economically with carnauba wax and which are the equal of carnauba wax in many of its usual characteristics and better than carnauba wax in many significant respects.

Another object of the invention is to provide a method whereby polypropylene can be formed in waxy form of extreme hardness while retaining the high softening point characteristic of polypropylene in plastic form.

Other objects will be apparent from the description and claims which follow.

These and other objects are attained by means of this invention wherein synthetic waxes of low melt viscosity comparable to carnauba wax and having hardness and softening point characteristics much higher than carnauba wax are readily prepared by forming polypropylene of a molecular weight in the range of 1000 to 8000 by special techniques as described hereinafter. The polypropylene waxes embodying this invention are characterized by a highly crystalline character as evidenced by a density in excess of 0.90, and these waxes also have softening points (ASTM D36–26 ball and ring method) of at least 130° C. and penetration hardness values (ASTM D5–52) of substantially 0 at 100 g. load for 5 seconds and below 2 at 250 g. load for 5 seconds, and an acid number of substantially zero. These softening point values and hardness values are considerably higher than the corresponding values for carnauba wax which has a softening point of the order of 85° C. and a penetration hardness value of about 6 under 250 g. load for 5 seconds. Despite these greatly improved softening point and hardness characteristics, the melt viscosity of the waxes embodying this invention is comparable to the low melt viscosity of carnauba wax.

As indicated above, the polypropylene waxes of this invention have molecular weights in the range of 1000–8000 whereas ordinarily polypropylene prepared either by direct polymerization to this molecular weight range or by heating at 150–170° C. are viscous oils or rubbery semisolids. In accordance with the present invention, these unusual polypropylene waxes are prepared by heating, at a temperature of 300–450° C., crystalline polypropylene having a density of at least 0.90 and an average molecular weight of at least 20,000 until the molecular weight is reduced to a value within the range of 1000–8000. The heating in accordance with this invention is carried out in the substantial absence of oxygen and can be effected in an inert atmosphere, or in a solvent medium, but is desirably effected by heating under vacuum. The reason why crystalline polypropylene waxes having density values of at least 0.90, ball and ring softening points of at least 130° C. and hardness values of 0 at 100 g. load for 5 seconds and below 2 at 250 g. load for 5 seconds can be prepared by heating at temperatures of 300–450° C. until the molecular weight is within the range of 1000–8000 is not understood at this time since other polypropylenes having molecular weight values within this range have quite different characteristics. Furthermore, the heating in accordance with this invention does not appear to be a simple thermal degradation to give polymer molecules within the desired range, since otherwise it should be possible to polymerize propylene directly to the same type of waxy polymers by merely stopping the polymerization when the molecular weight values are within the range of 1000–8000. As indicated hereinabove, this is not possible, and the waxes embodying this invention thus differ in some way which is not apparent from the ordinary low molecular weight polypropylene. Furthermore, it is not understood why heating at 300–450° C. will give the waxy polymers inasmuch as heating at 150–170° C. completely reduces the polymer to a transparent viscous mass which is of no use.

In practicing the invention, any of the crystalline polypropylenes characterized by a density of at least 0.90 and a molecular weight of at least 20,000 and preferably 50,000 to 500,000, can be used for conversion to the waxy materials embodying the invention. The method by which the polyprepylene is formed appears to be wholly immaterial, and the scope of the invention is therefore not limited by the preparative method employed, provided the polypropylene used as a starting material has a density of at least 0.90 and a molecular weight of at least 20,000. As indicated, the degradation can be carried out in an inert atmosphere substantially free of oxygen, which can be either an inert gas such as nitrogen or the like or a hydrocarbon solvent, but is preferably effected under vacuum, within the temperature range of 300–450° C. and preferably 350–450° C. The time of heating will vary widely from periods of several minutes to several hours depending upon such variable factors as the temperature employed within the range herein disclosed as well as the molecular weight of the polypropylene being converted, the desired molecular weight of the product within the range of 1000–8000 and similar variable factors. Thus, the molecular weight of the waxy product can be changed by variation in the temperature or time of heating, higher temperatures and longer times leading to lower molecular weight products. Consequently, the time of heating will depend upon the correlation of the several variable factors and the time of heating is determined by the molecular weight of the product, since the heating is terminated when the molecular weight is within the range of 1000–8000.

The synthetic waxes prepared in accordance with this invention have unusual utility since they are extremely hard which makes them particularly applicable for use in protective coatings, wax formulations, varnishes and the like. The high softening point of the waxes gives products which do not soften under ordinary temperature conditions, and products having softening points in excess of 150° C. and even in excess of 160° C. can be prepared in accordance with this invention. The waxes of the invention can be used alone or can be used in admixture with other synthetic or naturally occurring waxes, either in addition to or as a replacement for conventional waxes commonly used in wax formulations. Thus, the waxes embodying the invention form excellent substitutes for carnauba wav and actually upgrade the wax formulations wherein a part or all of the carnauba wax is replaced by the waxes prepared as described herein. The waxes embodying the invention can also be used in combination with paraffin waxes, polyethylene waxes, and other similar synthetic or naturally occurring waxes since they are compatible with the materials ordinarily used in wax formulations. The low melt viscosity characteristics of the waxes of this invention make it possible to readily employ these materials as protective coatings which are applied from the molten state. Even when used in combination with other waxes, such as carnauba wax, the polypropylene waxes flow as readily as do the carnauba waxes and even more readily than do such materials as the polyethylene waxes. The waxes as prepared herein by heating in the absence of oxygen are nonemulsifiable waxes exhibiting an acid number of substantially zero. The preparation of emulsifiable waxes having generally similar physical characteristics but of somewhat lower hardness and softening point and somewhat higher melt viscosity is disclosed in my copending application Serial No. 639,188, filed February 11, 1957.

The waxes embodying the invention can be prepared by heating in any desired manner using conventional equipment, and the preparation is adapted for either batch or continuous operation. Thus, the highly crystalline polypropylene having a molecular weight in excess of 20,000 can be heated in bulk under nitrogen or other inert gas or under vacuum until the mass reaches an average molecular weight within the range of 1000–8000 as described. Likewise, the heating can be carried out in a flowing stream reactor such as a tubular reactor if desired or can be effected in an inert hydrocarbon solvent, either batchwise or in a continuous flowing stream process. The preparation of typical synthetic waxes embodying the invention is illustrated in the following examples, but it will be understood that the examples are merely illustrative and not intended to limit the scope of the invention unless otherwise specifically indicated.

EXAMPLE 1

Polypropylene resulting from the polymerization of propylene with a triethylaluminum-titanium tetrachloride catalyst, was fractionated by successive extractions with isopropyl ether, hexane, benzene, and toluene, whereby a highly crystalline fraction was obtained from the toluene having a density of 0.91 and an inherent viscosity of 1.69 in tetralin at 145° C. This highly crystalline, high molecular weight polypropylene was then heated under vacuum (0.1 mm. Hg) in a tubular reactor at 360° C. for one hour. The resulting product was a very hard, brittle wax with an inherent viscosity of 0.30 and a density of 0.913. This viscosity corresponds to a molecular weight of the order of 4000. The waxy product was readily flowable in the molten state and had a melting point in excess of 130° C. Typical properties of this and other polypropylene waxes embodying the invention are summarized in Table 1.

EXAMPLE 2

A highly crystalline polypropylene was prepared by polymerizing propylene using an aluminumtriethyl-titanium trichloride catalyst mixture, and this polymer had a density of 0.91 and an inherent viscosity of 2.5. The polymer was then heated under vacuum at 400° C. for one hour to give a hard, brittle wax melting at 158° C. and having a density of 0.921 and an inherent viscosity of 0.33.

EXAMPLE 3

The preparation of the synthetic waxes can also be carried out in a hydrocarbon vehicle as illustrated by the fact that crystalline polypropylene having a density of the order of 0.91 and a molecular weight in excess of 50,000 was converted to a wax by heating a dispersion of the polymer in heptane in an autoclave at 400° C. for one hour. The inherent viscosity of the product was 0.45.

The unusual combination of physical characteristics evidenced by the waxes embodying the invention is shown by the data summarized in Table 1.

Table 1

| | Ring and Ball Softening Pt. (ASTM D36-26), °C. | Melt Viscosity | Penetration Hardness (ASTM D5-52) | | Acid No. |
|---|---|---|---|---|---|
| | | | 100 g./5 sec. | 250 g./5 sec. | |
| Oxidized Polyethylene Wax | 103 | High | 1 | 5.5 | 10 |
| Polyethylene Wax | 105 | High | 0-1 | 7.5 | 0 |
| Carnauba Wax | 85 | Low | 0 | 6.0 | 10.6 |
| Polypropylene Wax | 140 | Low | 0 | 1.5 | 0 |
| Do | 164 | Low | 0 | 1.0 | 0 |

As can be seen from the table, the polypropylene waxes which embody this invention are much higher melting and much harder than either carnauba wax or polyethylene wax which have heretofore been considered to be extremely hard and high melting waxes.

Despite these unusually high properties, the melt viscosity of the polypropylene waxes is very low and compares favorably with the melt viscosity of carnauba wax. When these waxes were used in combination with carnauba wax in conventional wax formulations as well as replacements for carnauba wax, they made possible the deposition of extremely hard coatings which did not soften at ordinary temperatures. The polypropylene waxes also showed excellent compatibility with paraffin waxes and the various naturally occurring waxes including both the vegetable and mineral waxes.

Thus by means of this invention new and improved synthetic waxes are readily prepared having characteristics which are better than those of the best naturally occurring or synthetic waxes known heretobefore.

Although the invention has been described in detail with particular reference to certain preferred embodiments thereof, it will be understood that variations and modifications can be effected within the spirit and scope of the invention as described hereinabove and as defined in the appended claims.

I claim:

1. The method of making a synthetic wax having low melt viscosity in combination with high hardness and high softening point which comprises heating, at a temperature of 300–450° C., crystalline polypropylene having a density of at least 0.90 and an average molecular weight of at least 20,000 until the molecular weight is reduced to a value within the range of 1000–8000.

2. The method of making a synthetic wax having low melt viscosity in combination with high hardness and high softening point which comprises heating, at a temperature of 350–450° C., crystalline propylene having a density of at least 0.90 and an average molecular weight in the range of 50,000–500,000 until the molecular weight of the resulting synthetic wax is within the range of 1000–8000, the resulting synthetic wax being characterized by a density above 0.90, a ball and ring (ASTM D36-26) softening point above 130° C., a penetration hardness value (ASTM D5-52) of 0 at 100 g. load for 5 seconds and below 2 at 250 g. load for 5 seconds, and being readily flowable in molten form.

3. A synthetic polypropylene wax which is readily flowable in molten form and which has an average molecular weight in the range of 1000–8000, a density of at least 0.90, an ASTM D36-26 ball and ring softening point of at least 130° C., an ASTM D5-52 penetration hardness value of 0 at 100 g. load for 5 seconds and below 2 at 250 g. load for 5 seconds, and an acid number of substantially zero.

4. A synthetic polypropylene wax of low melt viscosity having an average molecular weight in the range of 1000–8000, a density of 0.90–0.93, an ASTM D36-26 ball and ring softening point in the range of 135–170° C., an ASTM D5-52 penetration hardness value of 0 at 100 g. load for 5 seconds and below 2 at 250 g. load for 5 seconds, and an acid number of zero, said wax being the product obtained by heating, at a temperature of at least 300° C., crystalline polypropylene having a density of at least 0.90 and an average molecular weight of at least 20,000.

5. A synthetic polypropylene wax of low melt viscosity having an average molecular weight in the range of 1000–8000, a density of 0.90–0.93, an ASTM D36-26 ball and ring softening point in the range of 135–170° C., an ASTM D5-52 penetration hardness value of 0 at 100 g. load for 5 seconds and below 2 at 250 g. load for 5 seconds, and an acid number of zero, said wax being the product obtained by heating, at a temperature of 350–450° C., crystalline polypropylene having a density of at least 0.90 and an aveage molecular weight in the range of 50,000–500,000.

References Cited in the file of this patent

UNITED STATES PATENTS 2,372,001     Joyce _____ Mar. 20, 1945

FOREIGN PATENTS 538,782     Belgium _____ Dec. 6, 1955

Notice of Adverse Decision in Interference

In Interference No. 90,960 involving Patent No. 2,835,659, J. E. Guillet, POLYPROPYLENE WAXES AND METHOD OF MAKING, final judgment adverse to the patentee was rendered Nov. 25, 1964, as to claim 1.

[*Official Gazette May 4, 1965.*]